United States Patent
Bak et al.

(10) Patent No.: US 12,504,372 B2
(45) Date of Patent: Dec. 23, 2025

(54) SYSTEMS AND METHODS FOR MEASURING LIGHT BEAM SCATTERING

(71) Applicant: The Texas A&M University System, College Station, TX (US)

(72) Inventors: Junhwi Bak, College Station, TX (US); Yue Wu, Mission Viejo, CA (US); Richard Bryant Miles, Bryan, TX (US); Christopher M. Limbach, Ann Arbor, MI (US)

(73) Assignee: The Texas A&M University System, College Station, TX (US)

( * ) Notice: Subject to any disclaimer, the term of this patent is extended or adjusted under 35 U.S.C. 154(b) by 167 days.

(21) Appl. No.: 18/233,242

(22) Filed: Aug. 11, 2023

(65) Prior Publication Data
US 2024/0241049 A1 Jul. 18, 2024

Related U.S. Application Data

(60) Provisional application No. 63/371,104, filed on Aug. 11, 2022.

(51) Int. Cl.
*G01N 21/49* (2006.01)
(52) U.S. Cl.
CPC ....... *G01N 21/49* (2013.01); *G01N 2201/068* (2013.01)
(58) Field of Classification Search
CPC .......................... G01N 21/49; G01N 2201/068
See application file for complete search history.

(56) References Cited

U.S. PATENT DOCUMENTS

2017/0059476 A1* 3/2017 Kavoori Sethumadhavan ............ G01N 21/3504
2022/0160263 A1* 5/2022 Lepak .................. A61B 5/1459

OTHER PUBLICATIONS

Carbone, Emile, and Sander Nijdam. "Thomson scattering on non-equilibrium low density plasmas: principles, practice and challenges." Plasma Physics and Controlled Fusion 57.1 (2014): 014026 (Year: 2014).*
Klarenaar, B. L. M., et al. "Note: Rotational Raman scattering on CO2 plasma using a volume Bragg grating as a notch filter." Review of Scientific Instruments 86.4 (2015) (Year: 2015).*
Paillet, Matthieu, et al. "High performance resonance Raman spectroscopy using volume Bragg gratings as tunable light filters." Review of Scientific Instruments 81.5 (2010) (Year: 2010).*

(Continued)

*Primary Examiner* — Kara E. Geisel
*Assistant Examiner* — Roberto Fabian, Jr.
(74) *Attorney, Agent, or Firm* — Conley Rose, P.C.

(57) ABSTRACT

A system for measurement of light scattering from a test article includes a light emitting device, configured to emit a light beam onto the test article along light axis, a collection assembly configured to collect scattered light from the test article along a measurement axis that is oriented at a non-zero angle from the light axis, wherein the collection assembly includes a first angular spectral filter, and a second angular spectral filter spaced from the first angular spectral filter along the measurement axis, wherein a position or orientation of at least one of the first angular spectral filter and the second angular spectral is adjustable relative to the measurement axis.

21 Claims, 13 Drawing Sheets

(56) References Cited

OTHER PUBLICATIONS

Slikboer E, Walsh J. Impact of electrical grounding conditions on plasma-liquid interactions using Thomson scattering on a pulsed argon jet. Scientific Reports. Sep. 7, 2021;11(1).*
Van de Sande, Marcus Johannes. "Laser scattering on low temperature plasmas: high resolution and stray light rejection." (2002) (Year: 2002).*
8. Bak, Junhwi, et al. "High resolution spatially extended 1D laser scattering diagnostics using volume Bragg grating notch filters." Review of Scientific Instruments 94.2 (2023) (Year: 2023).*
M. Paillet et al: "High performance resonance Raman spectroscopy using volume Bragg gratings as tunable light filters", Review of Scientific Instruments 81, May 20, 2010.
B.L.M. Klarenaar et al: "Note: Rotational Raman scattering on CO2 plasma using a volume Bragg grating as a notch filter", Review of Scientific Instruments 86, Apr. 20, 2015.
B. Vincent et al: "A compact new incoherent Thomson scattering diagnostic for low-temperature plasma studies", Plasma Sources Science and Technology 27, May 8, 2018.

* cited by examiner

SYSTEMS AND METHODS FOR MEASURING LIGHT BEAM SCATTERING

CROSS-REFERENCE TO RELATED APPLICATIONS

This application claims benefit of U.S. provisional patent application Ser. No. 63/371,104 filed Aug. 11, 2022 and entitled "Systems and Methods for Measuring Light Beam Scattering," which is hereby incorporated herein by reference in its entirety for all purposes.

STATEMENT REGARDING FEDERALLY SPONSORED RESEARCH OR DEVELOPMENT his invention was made with government support under N00014-20-1-2348 awarded by the Office of Naval Research.

BACKGROUND

Laser light scattering is a diagnostic technique which allows non-perturbative access to test articles in physically harsh high-pressure/high-temperature environments where measurements by a physical probe are impractical. Accurate measurement of the relevant parameters of the scattering gas (e.g., temperature, density) allow for the tuning and validation of physical simulation models, ultimately leading to a better understanding of physics that may be utilized in manifold applications.

BRIEF SUMMARY OF THE DISCLOSURE

An embodiment of a system for measurement of light scattering from a test article comprises a light emitting device, configured to emit a light beam onto the test article along light axis, a collection assembly configured to collect scattered light from the test article along a measurement axis that is oriented at a non-zero angle from the light axis, wherein the collection assembly comprises a first angular spectral filter, and a second angular spectral filter spaced from the first angular spectral filter along the measurement axis, wherein a position or orientation of at least one of the first angular spectral filter and the second angular spectral is adjustable relative to the measurement axis. In some embodiments, the collection assembly comprises a camera that is configured to capture an image of the scattered light, wherein the first angular spectral filter and the second angular spectral filter are positioned between the test article and the camera along the measurement axis, and wherein the second angular spectral filter is positioned between the first angular spectral filter and the camera along the measurement axis. In some embodiments, the collection assembly comprises a monochromator coupled to the camera. In certain embodiments, a pitch or a yaw relative to the measurement axis of at least one of the first angular spectral filter and the second angular spectral filter is adjustable. In certain embodiments, the first angular spectral filter is oriented at a first yaw angle relative to the measurement axis and the second angular spectral filter is oriented at a second yaw angle relative to the measurement axis that is different from the first yaw angle. In some embodiments, the first angular spectral filter is oriented at a first pitch angle relative to the measurement axis and the second angular spectral filter is oriented at a second pitch angle relative to the measurement axis that is different from the first pitch angle. In some embodiments, at least one of the first angular spectral filter and the second angular spectral filter are rotatable about the measurement axis. In certain embodiments, the system comprises a first lens positioned between the first angular spectral filter and the test article along the measurement axis, and a second lens positioned between the second angular spectral filter and a camera of the collection assembly along the measurement axis. In certain embodiments, the first angular spectral filter and the second angular spectral filter each comprise a Volume Bragg grating filter. In some embodiments, the first angular spectral filter and the second angular spectral filter each comprise a notch filter. In some embodiments, the system comprises a filter adjuster coupled to at least one of the first angular spectral filter and the second angular spectral filter for rotating the angular spectral filter relative to the measurement axis 35.

An embodiment of a system for measurement of light scattering from a test article comprises a light emitting device, configured to emit a light beam onto the test article along light axis, a collection assembly configured to collect scattered light from the test article along a measurement axis that is oriented at a non-zero angle from the light axis, wherein the collection assembly comprises a first angular spectral filter positioned along the measurement axis, and a first filter adjuster coupled to the first angular spectral filter and configured to rotate the first angular spectral filter to adjust at least one of a pitch angle and a yaw angle of the first angular spectral filter relative to the measurement axis. In certain embodiments, the system comprises a lens positioned along the measurement axis and having a focal length that is equal to or greater than 25 millimeters. In certain embodiments, the system comprises a lens positioned along the measurement axis having a f/# between ½ and 20. In some embodiments, the first filter adjuster comprises a motorized actuator. In some embodiments, the collection assembly further comprises a second angular spectral filter spaced along the measurement axis from the first angular spectral filter, and a second filter adjuster coupled to the first angular spectral filter and configured to rotate the first angular spectral filter to adjust at least one of a pitch angle and a yaw angle of the first angular spectral filter relative to the measurement axis. In certain embodiments, the first angular spectral filter comprises a Volume Bragg grating filter.

An embodiment of a method for measurement of light scattering from a test article comprises (a) emitting a light beam from a light emitting device onto the test article along light axis whereby scattered light propagates from the test article along a measurement axis that is at a non-zero angle to the light axis, (b) passing the scattered light through a first angular spectral filter positioned along the measurement axis, (c) collecting the scattered light, filtered by the first angular spectral filter, by a collection assembly to form an image of the scattered light, and (d) rotating by a first filter adjuster the first angular spectral filter to adjust at least one of a pitch angle and a yaw angle of the first angular spectral filter relative to the measurement axis. In certain embodiments, (d) comprises orienting a filter ring formed on the image such that the filter ring extends tangentially along a laser line of the image. In some embodiments, the method comprises (e) passing the scattered light through a second angular spectral filter spaced along the measurement axis from the first angular spectral filter, and (f) rotating by a second filter adjuster the second angular spectral filter to adjust at least one of a pitch angle and a yaw angle of the second angular spectral filter relative to the measurement axis. In some embodiments, (f) comprises rotating the second angular spectral filter relative to the measurement axis independently of the first angular spectral filter. In certain embodiments, the first angular spectral filter comprises a Volume Bragg grating filter.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of exemplary embodiments of the disclosure, reference will now be made to the accompanying drawings in which.

DETAILED DESCRIPTION OF THE DISCLOSED EMBODIMENTS

Figure 1:
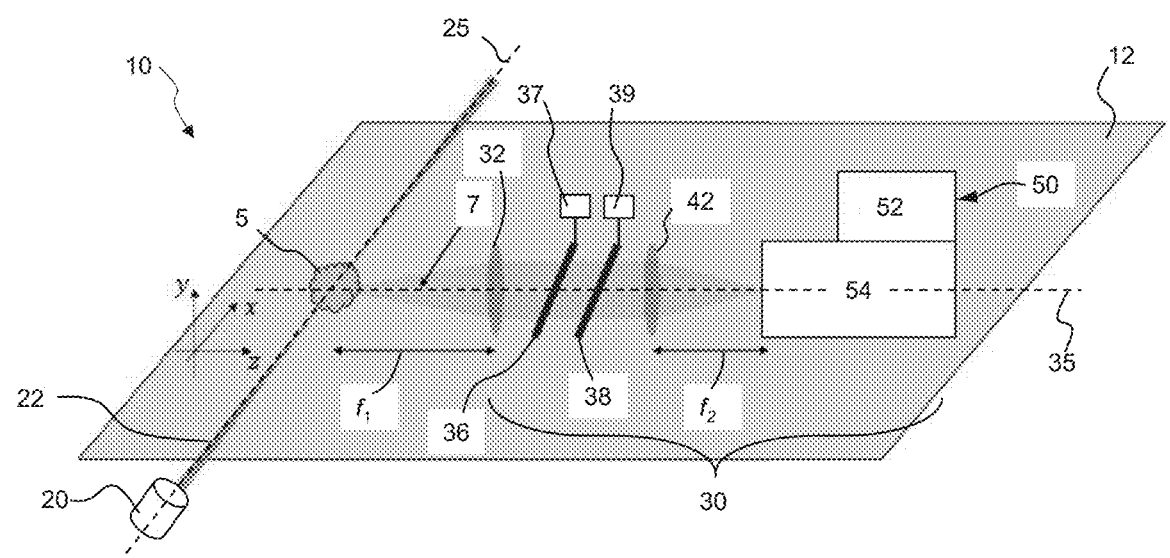
FIG. 1 is a schematic view of an embodiment of a system for the measurement of light scattering from a test article in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Further, as used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, laser light scattering techniques may be employed to provide access to test articles in physically harsh high-pressure/high-temperature environments where measurements by a physical probe are impractical. Scattering configurations employed in light scattering techniques are typically off-axis of a laser beam propagation axis (e.g., a light axis) of the light scattering system, with the practical maximum signal being collected perpendicular to the beam polarization direction. The laser-focused beam waist of light scattering systems is strongly localized, providing high spatial resolution that is set by the beam waist and another limiting aperture of the system. This configuration produces a localized measurement in contrast with path-integrated techniques such as optical emission spectroscopy and microwave interferometry which employ tomographic methods to spatially resolve the measurements. Along the laser beam of light scattering systems, the spatial resolution (which can be several tens of micrometers) is typically determined by the optics and detection camera's resolution. Meanwhile, the maximum resolution perpendicular to the beam is determined by the beam waist, which is typically about 100 to 200 micrometers.

Different scatterers located in the detection volume of a light scattering system such as, for example, monatomic and polyatomic neutral gas particles, ions, and electrons scatter differently. Knowledge of the scatterers and detection parameters allow for direct measurement of at least some of the state properties of the measured scatters. Different forms of light scattering may be leveraged to determine these state properties of the measured scatters. For example, Rayleigh scattering is a type of elastic light scattering in which light is scattered by the induced dipole moment from bound electrons. Rayleigh scattering is useful for determining gas temperature, velocity, and density. In addition, Raman scattering (an inelastic scattering process associated with the transition in a molecule's rotational or vibrational state) is another form of light scattering which provides molecular number densities and the rotational/vibrational temperatures. Further, Thomson scattering is a form of light scattering resulting from free electrons which permits measuring electron temperature and density and the electron energy distribution function, fundamental properties that define the composition of plasma.

Generally, the intensity of elastically-scattered light (e.g., Rayleigh scattering and stray light) is several orders greater than that of Raman or Thomson scattering. The intensity of stray light can also be significant because of reflections and other factors which permit stray light to pass through a detection system of the light scattering system if left unaddressed. In addition, the Thomson signal in many plasma applications such as, for example, low-temperature weakly-ionized plasma may be difficult to detect as a result of the neutral density being several orders of magnitude greater than the electron density. Thus, in order to detect Raman and Thomson scattering signals, other strong spectral features and background light near the laser wavelength (e.g., Rayleigh scattering and stray light) should be effectively isolated to prevent saturation of the detector of the light scattering system. Such near laser wavelength light rejection may be performed with several techniques such as, for example, triple grating spectrograph techniques, vapor cell techniques, glass/interference filter techniques, physical mask techniques, and volume Bragg grating (VBG) filter techniques.

With particular respect to VBG filters, a kind of angular spectral filters, techniques, past data analysis performed from laser scattering experiments using VBG filters were generally limited to point measurements. As used herein, the term "angular spectral filter" is defined as an optical filter that allows the rejection or transmission of light of a particular wavelength through selection of a filter orientation angle relative to an incoming light propagation direction. The point measurement loses spatial information, i.e., variation of the state properties of the scatterers, within its observing point size and requires individual measurements at each different location to retrieves spatial information. Eventually, this fails to capture any spatial structure of time-fluctuating test articles. This significantly limits the utility of such VBG filters in conventional light scattering techniques. The variations in the spectral signature along an extended line provide deep insight into important dynamic properties such as ionization gradients behind shock wave, chemical reactions near reacting surfaces and high temperature gradients across laser generated interactions.

Accordingly, systems and methods for measuring scattering of a light beam off of a test article are disclosed herein which realize one-dimensional (1D) measurement using angular spectral filters. Additionally, embodiments disclosed herein extend the measurement region using multiple angular spectral filters. The extended measurement volume provided along the laser propagation axis advantageously maintains the desired spatial resolution perpendicular to the laser propagation axis for applications that require high throughput light scattering diagnostics.

Example systems for measuring scattering of a light beam off of a test article are described. In certain embodiments, the systems may be useful for making observations and measurements of the test article. In some embodiments, the test article may include a plasma, a gas, or a solid object such as organic tissue (e.g., human tissue). For instance, the systems disclosed herein may be used for collecting measurements from organic tissue within a medical scanning device.

A system according to some of the embodiments disclosed herein may include a light emitting device that is to emit a light beam onto the test article along a light axis. In addition, the system may include a collection assembly that is configured to collect scattered light off of the test article that is generated by the light beam. The collection assembly may collect the scattered light along a measurement axis that is oriented at a non-zero angle (e.g., great than 0° and less than 180°) to the light axis.

The collection assembly may include one or more angular spectral filters positioned along the measurement axis. For instance, the collection assembly may include a pair of angular spectral filters that are spaced apart along the measurement axis. In addition, the collection assembly may include a pair of collimation lenses, such that the angular spectral filter(s) are positioned between the pair of collimation lenses along the measurement axis. Further, the collection assembly may include a camera that is adjacent one of the collimation lenses. Thus, the pair of collimation lenses and the angular spectral filter(s) is(are) positioned between the camera and the test article along the measurement axis. A monochromator may be coupled to the camera.

In certain embodiments, the angular spectral filter(s) comprise volume Bragg grating filters. The position and/or orientation of the angular spectral filter(s) may be adjusted to selectively block out or transmit a portion of the scattered light and/or the light beam. The angular spectral filter (or one or both of the angular spectral filters) may be rotated about the measurement axis and/or pivoted in one or more planes that extend radially outward from the measurement axis to enable selection of the sampled portion of the test article.

Referring initially to FIG. 1, an embodiment of a system 10 for the measurement of light scattering from a test article 5 is shown in accordance with principles disclosed herein. System 10 generally includes a light emitting device 20 and a collection assembly 30 supported on a support structure 12 (e.g., an optic table). In this exemplary embodiment, the test article 5 comprises a scattering gas formed from a plurality of particles including neutral particles, ions, and/or elections. However, in other embodiments, the test article 5 may alternatively comprise a plasma or a solid object such as organic tissue (e.g., human tissue). For instance, in certain embodiments, system 10 may be used for collecting measurements from organic tissue as part of a medical scanning device.

The light emitting device 20 of system 10 emits a light beam 22 propagating along a light axis (with vertical polarization in the y-direction in FIG. 1) which intersects and penetrates through the test article 5. In some embodiments, light emitting device 20 comprises a laser such as a probing laser. However, it may be understood that the configuration of light emitting device 20 may vary depending on the given application. In addition, the intersection of the light beam 22 with the test article 5 results in light scattering whereby at least some of the scattered light (indicated by arrow 7 in FIG. 1 and referred to herein as scattered light 7) propagates in a direction (shown as propagating along the z-direction in FIG. 1) that is at a non-zero angle (e.g., orthogonal) from the light axis 25 of light beam 22.

The collection assembly 30 of system 10 is generally configured to collect at least some of the scattered light 7 from the test article 5 along a measurement axis 35 that is oriented at a non-zero angle (e.g., an angle that is greater than 0° and less than 180°) to the light axis 25. In this exemplary embodiment, the measurement axis 35 extends at a non-zero axis (e.g., orthogonally) from the light axis 25 in a direction that is coincident with the propagation of the scattered light 7 (e.g., the scattered light 7 generally propagates along the measurement axis 35). It may be understood that measurement axis 35 of system 10 is an optical axis of the collection assembly 30 which extends perpendicular to the object plane. The objection plane is illustrated in FIG. 1 as a plane along which the light beam 22 propagates and which is oriented perpendicular to the measurement axis 35 (e.g., a plane extending parallel to the plane formed along the X-Y axes.

In this exemplary embodiment, collection assembly 30 generally includes a first angular spectral filter 36 and a second angular spectral filter 38 spaced from the first angular spectral filter 36 along the measurement axis 35. While in this exemplary embodiment system 10 includes a pair of angular spectral filters 36 and 38, in other embodiments, system 10 may include only a single angular spectral filter or more than two angular spectral filters.

The pair of angular spectral filters 36 and 38 are each generally configured to selectably reject (or accept) light at particular wavelengths based on the angle formed between the respective angular spectral filter 36 and 38 (particularly the filter planes of filters 36 and 38) and the measurement axis 35. In this manner, a bandwidth of selected wavelengths may be extracted from the scattered light 7 by adjusting the angles of the angular spectral filters 36 and 38. In certain embodiments, the bandwidth of selected wavelengths extends across hundreds of nanometers (nm).

In certain embodiments, angular spectral filters 36 and 38 comprise volume Bragg grating (VBG) filters including a diffraction grating in which modulation of the refractive index of the respective filter 36 and 38 occurs within photosensitive material of the respective filter 36 and 38. Depending on the diffraction angle, orientation, and/or modulation, VBGs may be classified, for example, as a transmitting Bragg grating (TBG), a reflecting Bragg grating (RBG), and a chirped Bragg grating (CBG). Among these different VBGs, RBGs exhibit two characteristic features including a narrow band spectral filter and an angular filter. Configured as a narrow-band filter (e.g., a notch filter configured to reject or select frequencies within a specific range), RBGs have spectral bandwidths as narrow as approximately 5 cm$^{-1}$. In addition, RBG filters allow the selective reflection of light at a specifically designed wavelength incidence at the Bragg condition, thus, performing a dual function as an angular and a spectral filter.

Reflective VBG filters may provide several advantages for light scattering diagnostics. First, the optical components needed to collect the scattered light filtered by the reflective VBG notch filer are significantly simplified with respect to other types of filters, resulting in maximization of the efficiency of the given system (as well as enhanced flexibility in the design of the given system) employing reflective VBG filters through the use of minimal optics. In addition, additional throughput may be obtained through the transmittance of the reflective VBG filter outside of the spectral rejection region, with transmittance of the unfiltered wavelengths being up to approximately 95% in some instances.

As described above, VBGs used as filters (e.g., angular spectral filters 36 and 38 in certain embodiments) may show spectral bandwidths as narrow as 5 cm$^{-1}$. As an example, and referring briefly to FIG. 2, a graph 70 is shown of an exemplary transmittance curve 72 of an optical density 4 (OD4) VBG filter configured for approximately 532 nm as a function of incident angle to the surface or plane of the VBG filter. As shown in graph 70, approximately within 0.1° of the designed input angle 6°, the exemplary OD4 VBG filter provides approximately 10$^{-4}$ attenuation. As will be discussed further herein, this angular spectral characteristic of filters (e.g., VBG filters) may be leveraged to implement 1D measurement for light scattering diagnostics.

The exemplary transmittance curve 72 of graph 70 particularly indicates that approximately 10$^{-4}$ transmission is attainable 6±0.05°, and 10$^{-3}$ transmission is attainable 6±0.09°. Transmittance curve 72 thus indicates that only a specific spatial range of light from the object plane can be rejected by the VBG filter if the incident angle of the approximately collimated light falls within the ranges specified above. In this example, the rejecting angle $\theta_r$ may be defined along with OD4 and OD3 ranges as $\delta\theta_{OD4}$ and $\delta\theta_{OD3}$, respectively, where $\theta_r=6°$, $\delta\theta_{OD4}=0.05°$, and $\delta\theta_{OD3}=0.09°$ are used as example values for a filter in the following evaluation.

Figure 3:
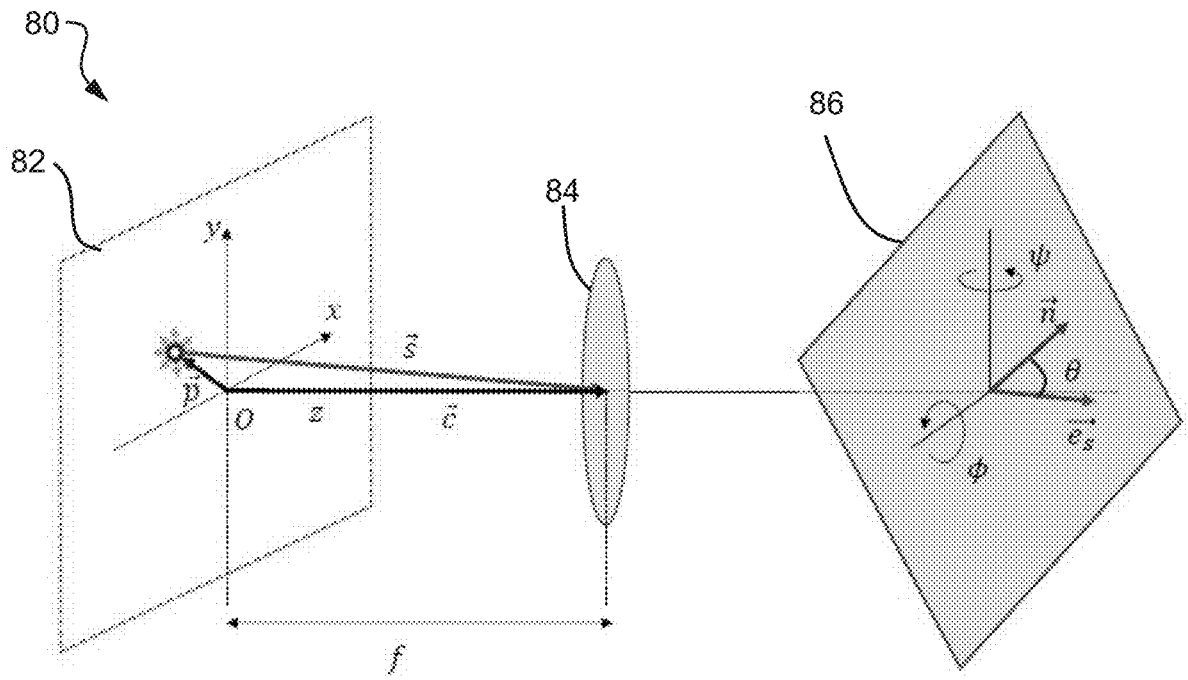
FIG. 3 is a schematic representation of an angular spectral filter in accordance with principles disclosed herein.

Referring to FIG. 3, a schematic representation 80 is presented illustrating an optical arrangement between an object plane 82, a collimation lens 84, and a filter plane 86. Additionally, in FIG. 3, $\vec{c}$ represents the position vector of the center of the collimation lens 84 ($\vec{c}=[0,0,f]^T$ in the x-y-z coordinate frame where f represents the focal length of the collimation lens 84); $\vec{p}$ represents a position vector of a point p on the object plane 82; $\vec{s}$ represents a vector from the point p to the center of the collimation lens 84 ($\vec{s} \equiv \vec{c} - \vec{p}$); $\vec{e}_s$ represents a unit vector of $\vec{s}$ ($\vec{e}_s \equiv \vec{s}/|\vec{s}|$); and $\vec{n}$ represents a unit normal vector of the VBG filter plane (the initial orientation $\vec{n}_i = [0,0,1]^T$ in this example).

For a scattering source p on the object plane 82 as a point source, the light scattered by the source p is collimated by the lens 84 (assuming that the lens 84 is positioned one focal length away from the object plane 82). In this example, the direction of the collimated rays is determined by a ray directly pointing at the center of the collimation lens 84 from the scattering source p. This collimated ray vector is denoted as $\vec{s}$ in FIG. 3. Not intending to be bound by any particular theory, the angle θ formed between $\vec{s}$ and $\vec{n}$ defines the incident angle of the ray to the filter, which may be expressed in accordance with Equation (1) presented below:

$$\theta = \cos^{-1}(\vec{e}_s \cdot \vec{n}) \tag{1}$$

Figure 2:
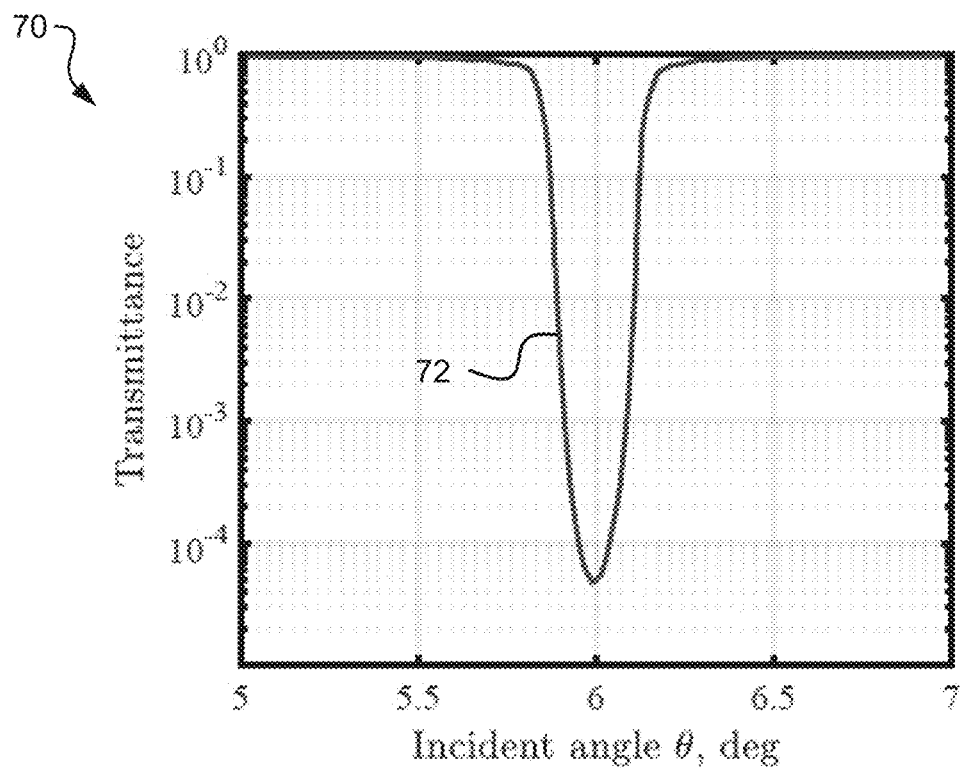
FIG. 2 is a graph illustrating a transmittance curve of an angular spectral filter in accordance with principles disclosed herein.

Thus, by calculating θ for each location on the object plane 82 while considering the transmittance curve 72 shown in FIG. 2, the spatial distribution of a rejected location may be identified, where the rejected location defines an annular or ring shape referred to herein as the "rejection ring." It may be understood that this technique for determining the rejected location is applicable to any angular spectral filters such as interference filters and holographic spectral filters.

Not intending to be bound by any particular theory, using the transmittance curve 72 shown in FIG. 2, a rejection ring (center) diameter $D_r$ may be estimated in accordance with Equation (2) presented below, the thickness of the OD4 ring ($t_{r,OD4}$) may be expressed in accordance with Equation (3) below, and the thickness of the OD3 ring ($t_{r,OD3}$) may be expressed in accordance with Equation (4) presented below:

$$D_r = 2f \tan\theta_r \tag{2}$$

$$t_{r,OD4} = f(\tan(\theta_r + \delta\theta_{OD4}) - \tan(\theta_r - \delta\theta_{OD4})) \tag{3}$$

$$t_{r,OD3} = f(\tan(\theta_r + \delta\theta_{OD3}) - \tan(\theta_r - \delta\theta_{OD3})) \tag{4}$$

Different VBG filters, having different angular rejection properties, generally have different rejection incident angles and OD4/OD3 ranges that may be obtained from their specifications. The two OD rings (OD4/OD3) are evaluated because either ring may be chosen for a respective diagnostic system depending on the attenuation requirement of the given test condition as part of a trade-off between the attenuation and the spatial rejection size along with other factors (e.g., cost and lead time).

Figure 4:
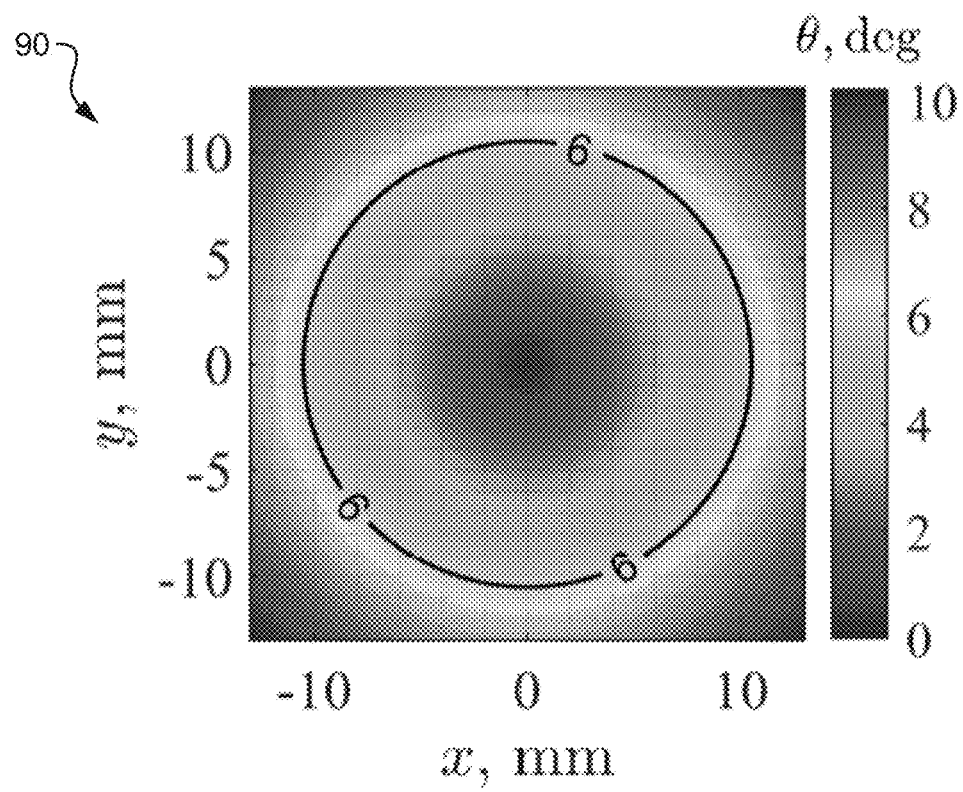
FIG. 4 is a map of incident angle to a filter plane of an angular spectral filter in accordance with principles disclosed herein.
Figure 5:
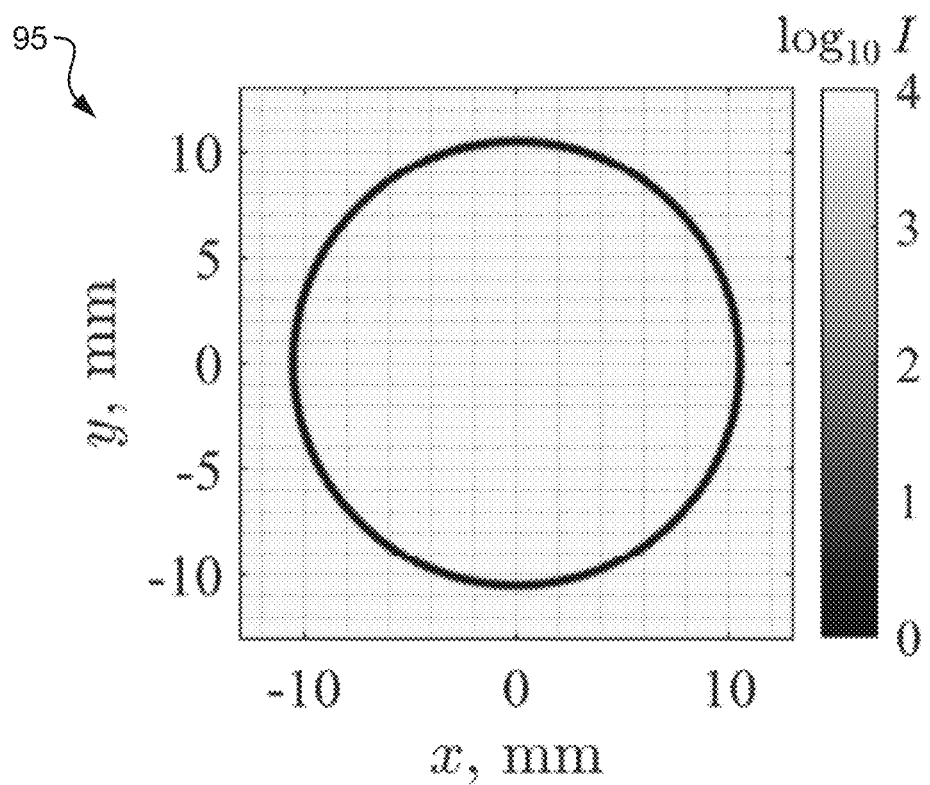
FIG. 5 is a map of light intensity in accordance with principles disclosed herein.

Referring to FIGS. 4 and 5, FIG. 4 illustrates an exemplary map 90 of incident angle to the filter plane 86 depending on the position of the scattering source p on the object plane 82 (e.g., an incident angle distribution). Additionally, FIG. 5 illustrates an exemplary map 95 of light intensity l. As indicated in maps 90 and 95, the attenuation by the VBG filter on a specific ring-shape region is observable. For these exemplary calculations, f=100 millimeters (mm) is used and an initial intensity, I=10$^4$, is given for every location on the object plane 82. The position having the incident angle θ=6° is indicated as a black solid line in map 90, and accordingly the rejected region appears as a ring shape in map 95. For map 95, the transmittance curve 72 shown in FIG. 2 is used ($D_r \approx 21$ mm, $t_{r,OD4} \approx 0.177$ mm, and $t_{r,OD3} \approx 0.318$ mm is obtained in this example).

In accordance with principles disclosed herein, the angle of the filter plane 86 may be tuned with two degrees of freedoms (DoFs): rotation with respect to the x-axis (pitch control) and rotation with respect to the y-axis (yaw control) using Euler angles. The angle of any vector from one plane (or frame of reference) to any other plane may be by relating them through a matrix transformation using rotation matrices.

Particularly, and not intending to be bound by any particular theory, a rotation matrix with respect x-axis (pitch) may be expressed in accordance with Equation (5) presented below (where φ represents the pitch angle), a rotation matrix with respect to the y-axis (yaw) may be expressed in accordance with Equation (6) presented below (where ψ represents the yaw angle), and the normal vector of the filter may be expressed in accordance with Equation (7) presented below:

$$R_x(\Phi) = \begin{bmatrix} 1 & 0 & 0 \\ 0 & \cos\Phi & -\sin\Phi \\ 0 & \sin\Phi & \cos\Phi \end{bmatrix} \tag{5}$$

$$R_y(\psi) = \begin{bmatrix} \cos\psi & 0 & -\sin\psi \\ 0 & 1 & 0 \\ -\sin\psi & 0 & \cos\psi \end{bmatrix} \tag{6}$$

$$\vec{n} = R_x(\Phi) R_y(\psi) \vec{n}_i \tag{7}$$

A final angle θ that rays from the point p with respect to the VBG filter may then be obtained from Equation (1) presented above.

Figure 6:
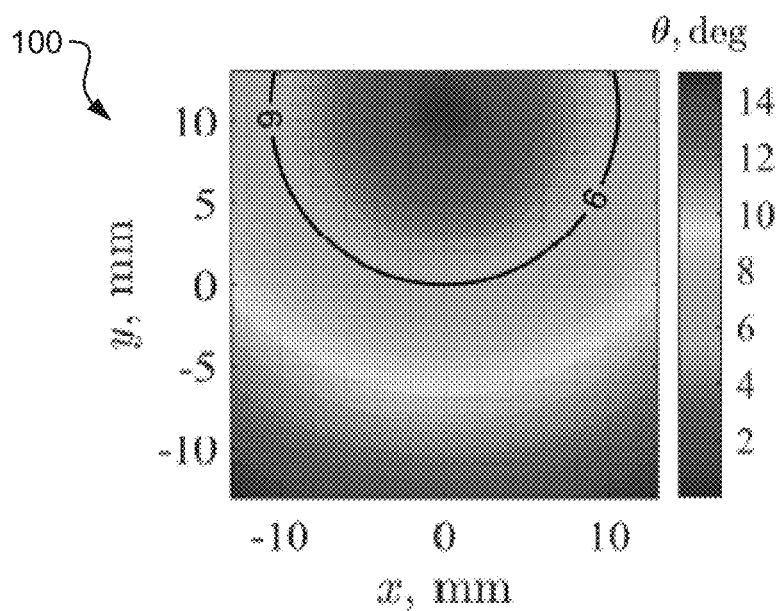
FIG. 6 is a map of an incident angle for a given pitch angle of an angular spectral filter in accordance with principles disclosed herein.
Figure 7:
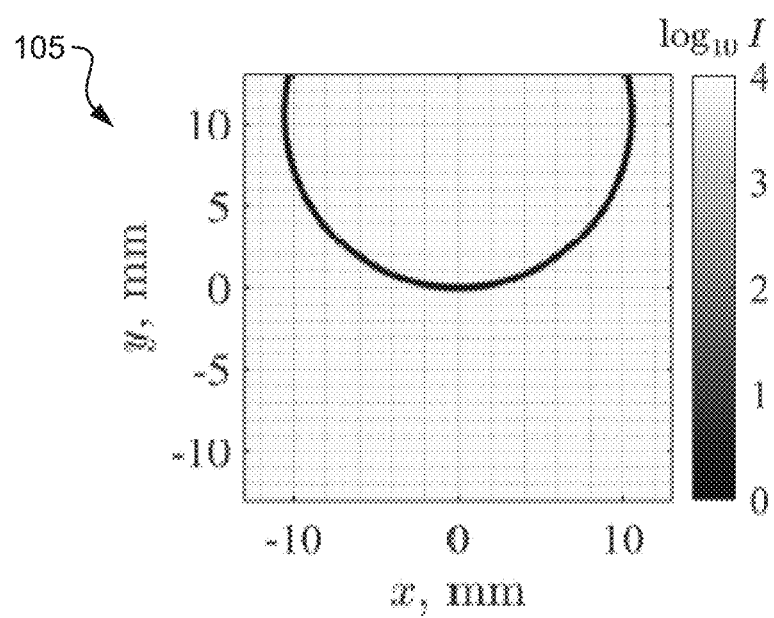
FIG. 7 is a map of light intensity for a given pitch angle of an angular spectral filter in accordance with principles disclosed herein.
Figure 8:
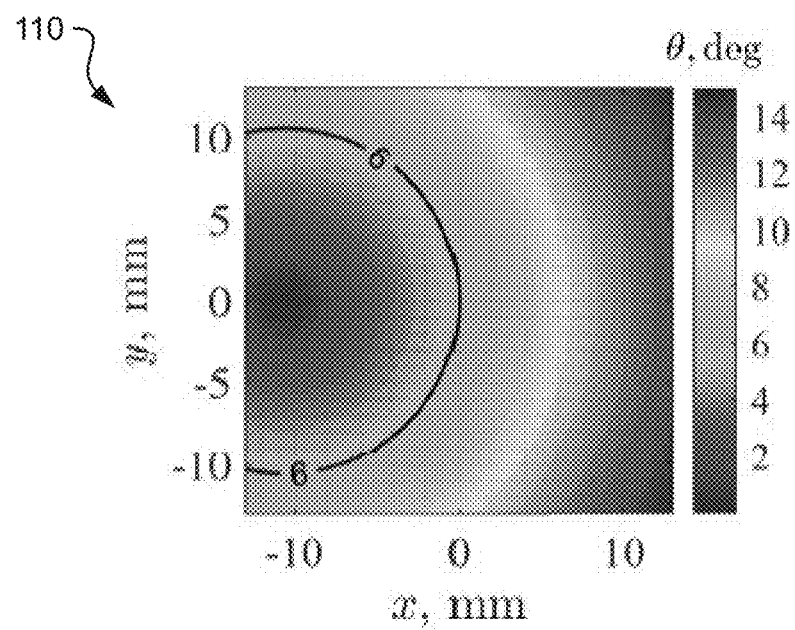
FIG. 8 is a map of an incident angle for a given yaw angle of an angular spectral filter in accordance with principles disclosed herein.
Figure 9:
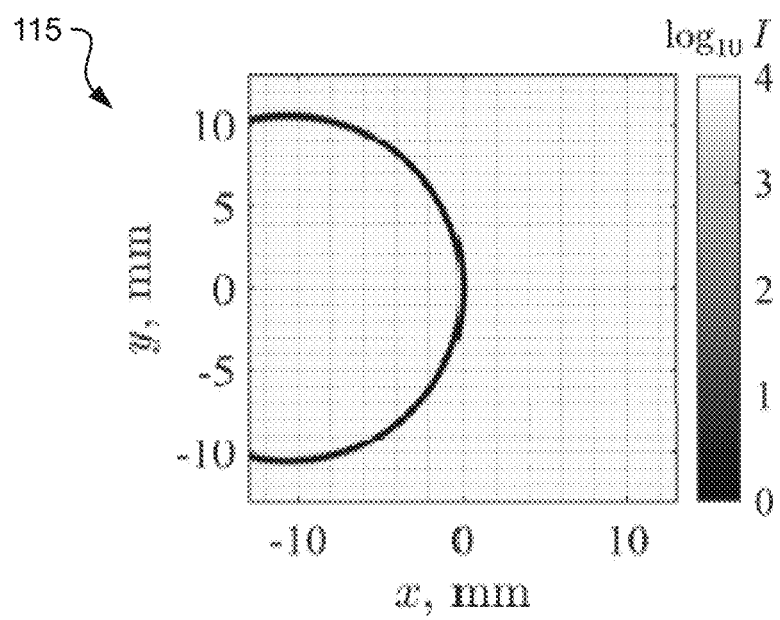
FIG. 9 is a map of light intensity for a given yaw angle of an angular spectral filter in accordance with principles disclosed herein.

Referring to FIGS. 6-9: FIG. 6 illustrates a map 100 of incident angle θ for a pitch angle φ=6°; FIG. 7 illustrates a map 105 of light intensity l for φ=6°; FIG. 8 illustrates a map 110 of incident angle θ for a yaw angle ψ=6°; and FIG. 9 illustrates a map 115 of light intensity l for ψ=6°. Maps 100-110 illustrate the influence of pitch and yaw angle adjustments. In this example, a φ control translates the rejection ring up and down along the y-axis while a ψ control translates the rejection ring left and right along the x-axis.

Generally, for rejection, of concern is the relative size and location of the rejection ring on the image of the laser beam region, imaged at the detector plane (e.g., the plane of the detector or camera of the diagnostic system). This is because without any rejection, the detector of the diagnostic system saturates due to the strong near laser wavelength light from Rayleigh scattering as well as reflections through the collection system of the diagnostic system. Therefore, the laser line light must generally be adequately blocked in the field of view of the detector in order to be able to collect the relatively weak rotational Raman and Thomson scattering light. In accordance with principles disclosed herein, for a given VBG filter, collimating/objective lens and focusing/imaging lens, the size of the rejection ring formed on the image of the light beam at the imaging plane (as well as its position on the light beam image) can be directly controlled by controlling the pitch and yaw angles. Such control may be enhanced through utilizing a second VBG filter.

Referring again to FIG. 1, In certain embodiments, a position or orientation of at least one of the first angular spectral filter 36 and the second angular spectral filter is adjustable relative to the measurement axis 35. For instance, in this exemplary embodiment, system 10 includes a first filter adjuster 37 coupled to the first angular spectral filter 36 and a second filter adjuster 39 coupled to the second angular spectral filter 38. The angles adjusted by filter adjusters 37 and 39 may comprise the pitch angles (e.g., the angular positions of filters 36 and 38 about the x-axis) and/or the yaw angles (e.g., the angular positions of filters 36 and 38 about the y-axis) of angular spectral filters 36 and 38 relative to the measurement axis 35 (e.g., relative to the direction of propagation of scattered light 7). In some embodiments, the filter adjusters 37 and 39 may be controlled by a controller or computer system of the system 10 in order to scan a desired bandwidth of selected wavelengths. Additionally, in some embodiments, filter adjusters 37 and 39 comprise a screw, a micrometer, a motorized actuator, and the like.

In addition, in this exemplary embodiment, collection assembly 30 additionally includes a pair of lenses including a first collimating/objective lens 32 and a second focusing/imaging lens 42 each positioned along the measurement axis 35. Particularly, lenses 32 and 42 are positioned along the measurement axis 45 whereby the pair of angular spectral filters 36 and 38 are positioned axially between the pair of lenses 32 and 42 along the measurement axis 35. While system 10 includes a pair of lenses 32 and 42 in this exemplary embodiment, it may be understood that in other embodiments the number of lenses of system 10 may be less than or more than two.

First collimating lens 32 has a first focal length $f_1$ extending along the measurement axis between the test article 5 and the lens 32. Additionally, second focusing lens 42 has a second focal length $f_2$ extending along the measurement axis between the lens 42 and the collection assembly 30. In some embodiments, the pair of lenses 32 and 42 may be set on moveable mounts or platforms (e.g., translation stages) to finely control the distance of the lens 32 from the test article 5 and/or the distance of lens 42 to the scattered light detector 50 to optimize ray collimation and/or focus. As will be described further herein focal lengths $f_1$ and/or $f_2$ may be adjusted or tuned to desirably adjust the properties of images captured by the collection assembly 30. In some embodiments, at least one of the focal lengths $f_1$ and/or $f_2$ is greater than 25 mm. In some embodiments, at least one of the focal lengths $f_1$ and/or $f_2$ is equal to or greater than 50 mm. In certain embodiments, at least one of the focal lengths $f_1$ and/or $f_2$ is equal to or greater than 100 mm. In certain embodiments, at least one of the focal lengths $f_1$ and/or $f_2$ is equal to or greater than 200 mm. Further, in some embodiments, the f/#, which is the ratio of the focal length to the diameter of the lens (e.g., of lenses 32 and/or 42), is selected in a range from ½ to 20 to optimize light collection efficiency.

Further, collection assembly 30 includes a scattered light detector 50 also positioned along the measurement axis 35 whereby both the pair of collimation lenses 32 and 42 and the pair of angular spectral filters 36 and 38 are positioned axially between the test article 5 and the scattered light detector 50. In this exemplary embodiment, scattered light detector 50 comprises a camera 52 configured to capture an image of the scattered light 7. In some embodiments, camera 52 comprises a charge-coupled device (CCD) such as, for example, an intensified CCD (ICCD) (a CCD combined with an intensifier), an electron-multiplying CCD (EMCCD) (a CCD combined with an electron-multiplier), and an electron-multiplying intensified CCD (emICCD) (a CCD combined with both an intensifier and an electron-multiplier).

In some embodiments, scattered light detector 50 additionally includes a monochromator 54 configured to transmit a selectable (e.g., mechanically selectable) band of wavelengths from a wider range of wavelengths provided to the monochromator 54 as an input (e.g., the scattered light 7 which has propagated through the pair of lenses 32 and 42 and the pair of angular spectral filters 36 and 38). The band of wavelengths selected by monochromator 54 may be provided as an input to the camera 52 which may record the input provided from the monochromator 54.

Figure 10:
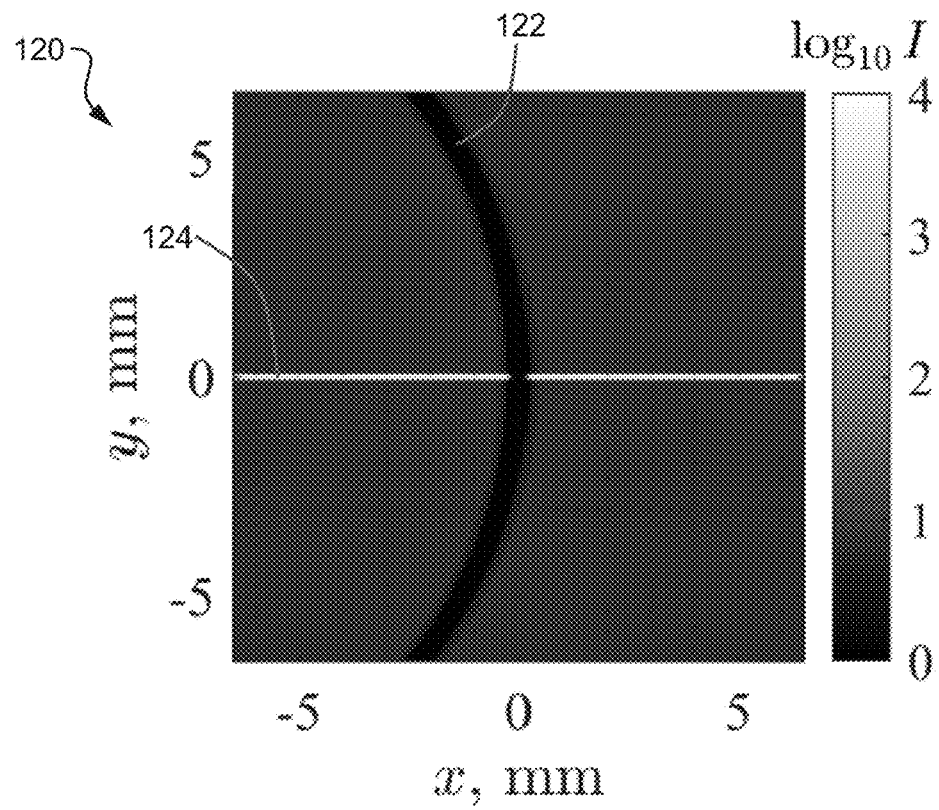
FIGS. 10 and 11 illustrate images formed using a single angular spectral filter in accordance with principles disclosed herein.
Figure 11:
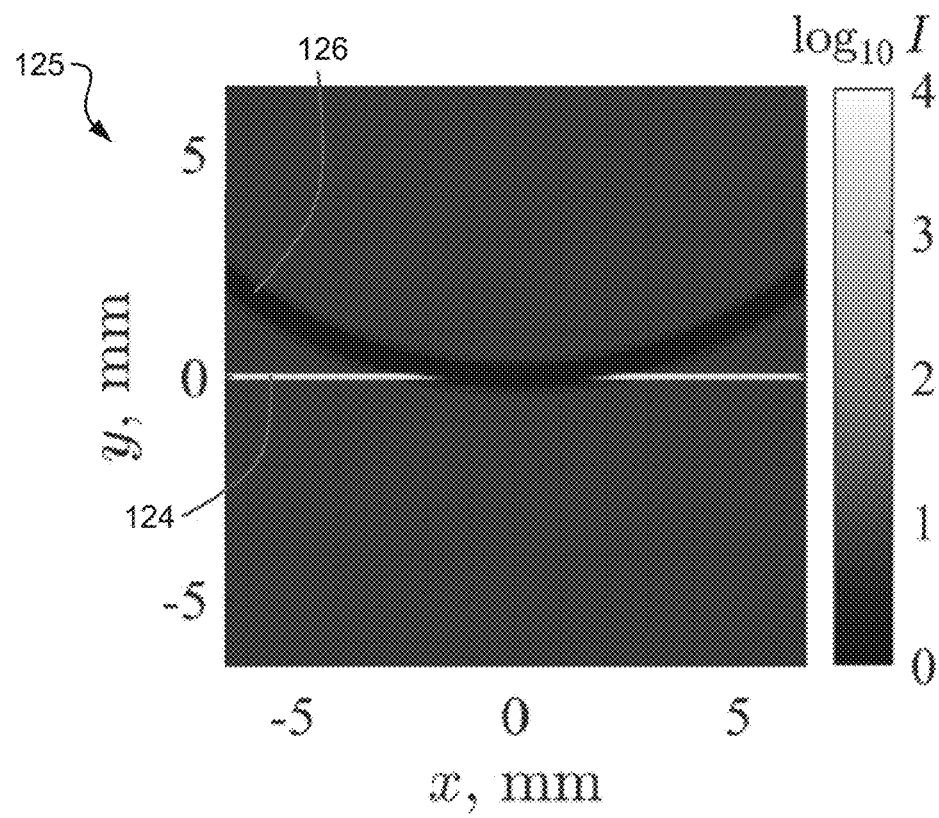

Referring to FIGS. 1, 10, and 11, FIGS. 10 and 11 illustrate exemplary images 120 and 125, respectively, formed using a single angular spectral filter (e.g., using only one of the filters 36 and 38 of system 10). Image 120 illustrates an exemplary first rejection ring 122 captured by collection assembly 30 along with a laser line 124 which is an image of the light beam 22. Similarly, image 125 illustrates an exemplary second rejection ring 126 with respect to the laser line 124.

Rejection rings 122 and 126 each have a corresponding radial thickness $t_r$. Image 120 illustrates the influence of adjusting the yaw angles of one of the angular spectral filters 36 and 38 (image 120 is formed with one of angular spectral filters 36 and 38 tuned to a pitch angle of 0° and a yaw angle of 6°). In addition, image 125 illustrates the influence of adjusting the pitch angles of one of the angular spectral filters 36 and 38 (image 125 is formed with one of the angular spectral filters 36 and 38 tuned to a pitch angle of 6° and a yaw angle of 0°).

The yaw angle tuning indicated in image 120 results from moving the rejection ring (captured by the collection assembly 30) by the filter adjusters 37 and 39 left or right (along the x-axis) whereby the rejection ring 122 of laser line image 120 extends perpendicularly with respect to the laser line 124. In this configuration, only a small portion of the laser line (e.g., ~200 micrometers (μm) in this example) is intersected by the perpendicular rejection ring 122, limiting system 10 in this configuration to the performance of a point measurement. On the other hand, by tuning or adjusting the pitch angle (e.g., increasing the pitch angle from 0° to 6°), system 10 may produce a rejection ring 126 which extends tangentially to the laser line 124. As a result, a wider spatial region (~2.5 mm in this example) of the laser line 124 falls into or intersects the tangential rejection ring 126. Thus, the wider spatial region of strong unwanted light, the wavelength of which falls within the filter's bandwidth allowing a 1D spatially-resolved measurement of interested scattering, the wavelength of which falls out of the filter's bandwidth, along the probing beam 22 lying in light axis 25 (along the x-axis in this example).

Images 120 and 125 demonstrate how specific angular adjustments to angular spectral filters 36 or 38 may result in either a point measurement (as shown in image 120) averaged over the number of pixels blocked along the light axis 125, or a 1D measurement (as shown in image 125) by resolving at each pixel row along the direction of the laser line 124. The intersection length of ~2.5 mm (the length of intersection along laser line 124 between laser line 124 and the tangential rejection ring 126) is sufficient to resolve a full distribution along the probing light beam 22 (along the x-direction in this example) of test article properties (e.g., properties of test article 5) such as, for example, thin discharge columns, microplasmas, streamers, etc. Importantly, the spatial resolution along the light axis 25 determined directly by the resolution of camera 52 and the imaging optics of system 10, may be as small as a few μm may be conveniently and quickly adjusted by the choice of imaging optics (e.g., via the filter adjusters 37 and 39). This is because each pixel row of images 120 and 125 corresponds to a different spatial location on the object plane where such resolution enables to resolve steep gradients.

Extended 1D Measurement with a VBG

Considering the rejection ring size ($D_r$), or the thickness ($t_r$) being proportional to the collimation lens focal length ($\propto$ f in accordance with Equations (2) through (4) presented above), the 1D measurement region (the region in which the given rejection ring intersects the laser line) with respect to the laser line may be expended or maximized by increasing the focal length of a collimation lens (e.g., lens 32 of system 10).

Figure 12:
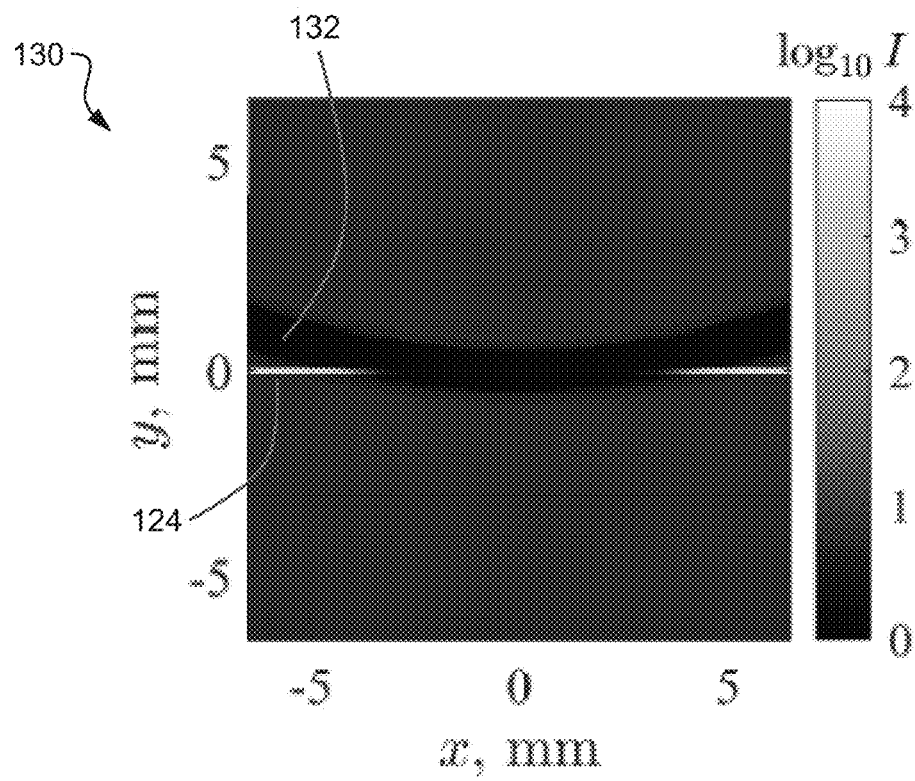
FIG. 12 illustrates an image formed using a single angular spectral filter having an increased focal length in accordance with principles disclosed herein.
Figure 13:
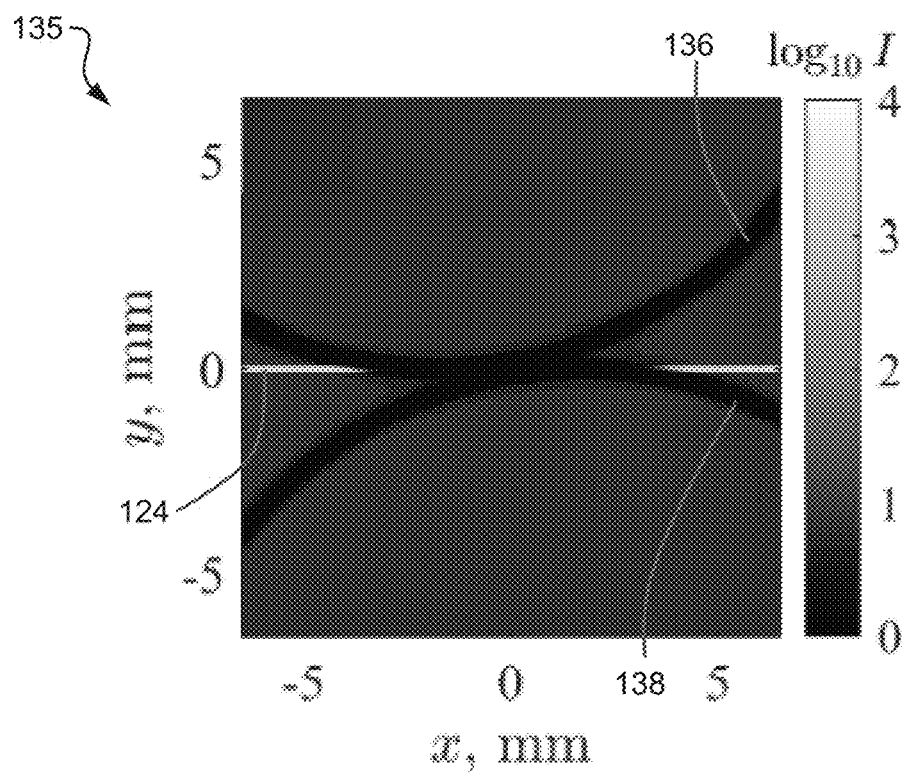
FIG. 13 illustrates an image formed using a pair of angular spectral filters in accordance with principles disclosed herein.

Referring to FIGS. 1, 12, and 13, FIGS. 12 and 13 illustrate exemplary images 130 and 135 of rejection ring 132 (image 130) and rejection rings 136 and 138 (image 135), respectively, formed using only one of the angular spectral filters 36 and 38 (image 130) having an increased focal length (f=200 mm as compared to f=100 mm for images 120 and 125), and both of the angular spectral filters 36 and 38 (image 135). Additionally, for image 130 the pitch angle is 6° and the yaw angle is 0°, respectively, while for image 135, the pitch angle is 6° and the yaw angle is 1° for one filter, and the pitch angle is −6° and the yaw angle is −1° for another filter, respectively. Compared to images 120 and 125, the increased focal length indicated by image 130 results in an increase in the radial thickness of rejection ring 132 whereby a greater (e.g., wider along the x-axis) 1D region of the laser line 124 may be intersected by the rejection ring 132, extending the spatial measurement domain. However, it should be noted that, as the lens 32 is positioned further away from the test article 5, the solid angle for the signal collection correspondingly decreases. For instance, in this example, increasing the focal length f from 100 mm to 200 mm results in an approximately four times weaker signal. Thus, there exists a trade-off between expanding the measurable 1D region (e.g., the region in which the rejection ring intersects the laser line) and total signal intensity (assuming a consistent filter size).

In order to avoid this trade-off between the size of the measurable 1D region and total signal intensity, the size of the measurable 1D region may be increased by utilizing both angular spectral filters 36 and 38 instead of increasing the focal lengths of lens 32, as indicated in image 135. In this example, the measurable 1D region of image 135 is increased up to ~5.5 mm, and may be obtained by slightly adjusting the yaw angle of the rejection rings 136 and 138 produced by angular spectral filters 36 and 38, respectively. Note that, as the total transmission of other wavelengths unaffected by the filter is typically >90%, the signal loss can be significantly reduced compared to the case of using a greater focal length lens.

Figure 14:
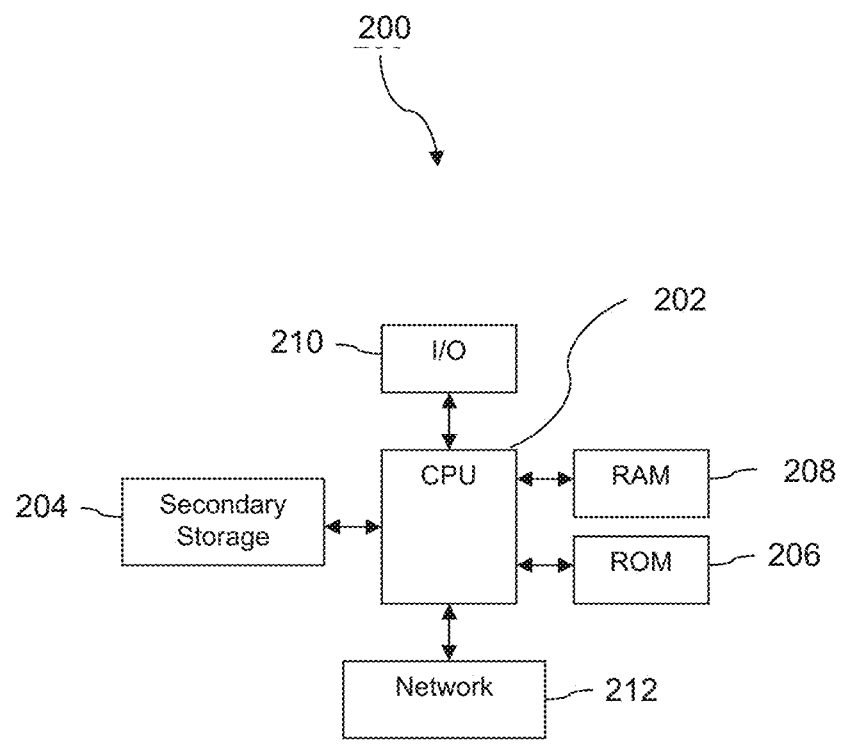
FIG. 14 is a block diagram of an embodiment of a computer system in accordance with principles disclosed herein.

Referring now to FIG. 14, an embodiment of a computer system 200 is shown suitable for implementing one or more components disclosed herein. As an example, computer system 200 may comprise a component of the system 10 shown in FIG. 1 in some embodiments whereby computer system 200 may control one or more components thereof. For instance, computer system 200 may control the operation of light emitting device 20, filter adjusters 37 and 39, and/or collection assembly 30. Thus, in certain embodiments, computer system 200 may control the angular tuning or adjustment of the angular spectral filters 36 and 38 so as to adjust the properties of the measurable 1D region (e.g., maximize the size or area of the 1D region) collected by the collection assembly 30.

The computer system 200 of FIG. 14 generally includes a processor 202 (which may be referred to as a central processor unit or CPU) that is in communication with memory devices including secondary storage 204, read only memory (ROM) 206, random access memory (RAM) 208, input/output (I/O) devices 210, and network connectivity devices 212. The processor 202 may be implemented as one or more CPU chips. It is understood that by programming and/or loading executable instructions onto the computer system 200, at least one of the CPU 202, the RAM 208, and the ROM 206 are changed, transforming the computer system 200 in part into a particular machine or apparatus having the novel functionality taught by the present disclosure.

Additionally, after the system 200 is turned on or booted, the CPU 202 may execute a computer program or application. For example, the CPU 202 may execute software or firmware stored in the ROM 206 or stored in the RAM 208. In some cases, on boot and/or when the application is initiated, the CPU 202 may copy the application or portions of the application from the secondary storage 204 to the RAM 208 or to memory space within the CPU 202 itself, and the CPU 202 may then execute instructions that the application is comprised of. In some cases, the CPU 202 may copy the application or portions of the application from memory accessed via the network connectivity devices 212 or via the I/O devices 210 to the RAM 208 or to memory space within the CPU 202, and the CPU 202 may then execute instructions that the application is comprised of. During execution, an application may load instructions into the CPU 202, for example load some of the instructions of the application into a cache of the CPU 202. In some contexts, an application that is executed may be said to configure the CPU 202 to do something, e.g., to configure the CPU 202 to perform the function or functions promoted by the subject application. When the CPU 202 is configured in this way by the application, the CPU 202 becomes a specific purpose computer or a specific purpose machine.

Secondary storage 204 may be used to store programs which are loaded into RAM 208 when such programs are selected for execution. The ROM 206 is used to store instructions and perhaps data which are read during program execution. ROM 206 is a non-volatile memory device which typically has a small memory capacity relative to the larger memory capacity of secondary storage 204. The secondary storage 204, the RAM 208, and/or the ROM 206 may be referred to in some contexts as computer readable storage media and/or non-transitory computer readable media. I/O devices 210 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 212 may take the form of modems, modem banks, Ethernet cards, universal serial bus (USB) interface cards, wireless local area network (WLAN) cards, radio transceiver cards, and/or other well-known network devices. The network connectivity devices 212 may provide wired communication links and/or wireless communication links. These network connectivity devices 212 may enable the processor 202 to communicate with the Internet or one or more intranets. With such a network connection, it is contemplated that the processor 202 might receive information from the network, or might output information to the network. Such information, which may include data or instructions to be executed using processor 202 for example, may be received from and outputted to the network, for example, in the form of a computer data baseband signal or signal embodied in a carrier wave.

The processor 202 executes instructions, codes, computer programs, scripts which it accesses from hard disk, floppy disk, optical disk, flash drive, ROM 206, RAM 208, or the network connectivity devices 212. While only one processor 202 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 204, for example, hard drives, floppy disks, optical disks, and/or other device, the ROM 206, and/or the RAM 208 may be referred to in some contexts as non-transitory instructions and/or non-transitory information.

In an embodiment, the computer system 200 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, the functionality disclosed above may be provided by executing the application and/or applications in a cloud computing environment. Cloud computing may comprise providing computing services via a network connection using dynamically scalable computing resources.

Figure 15:
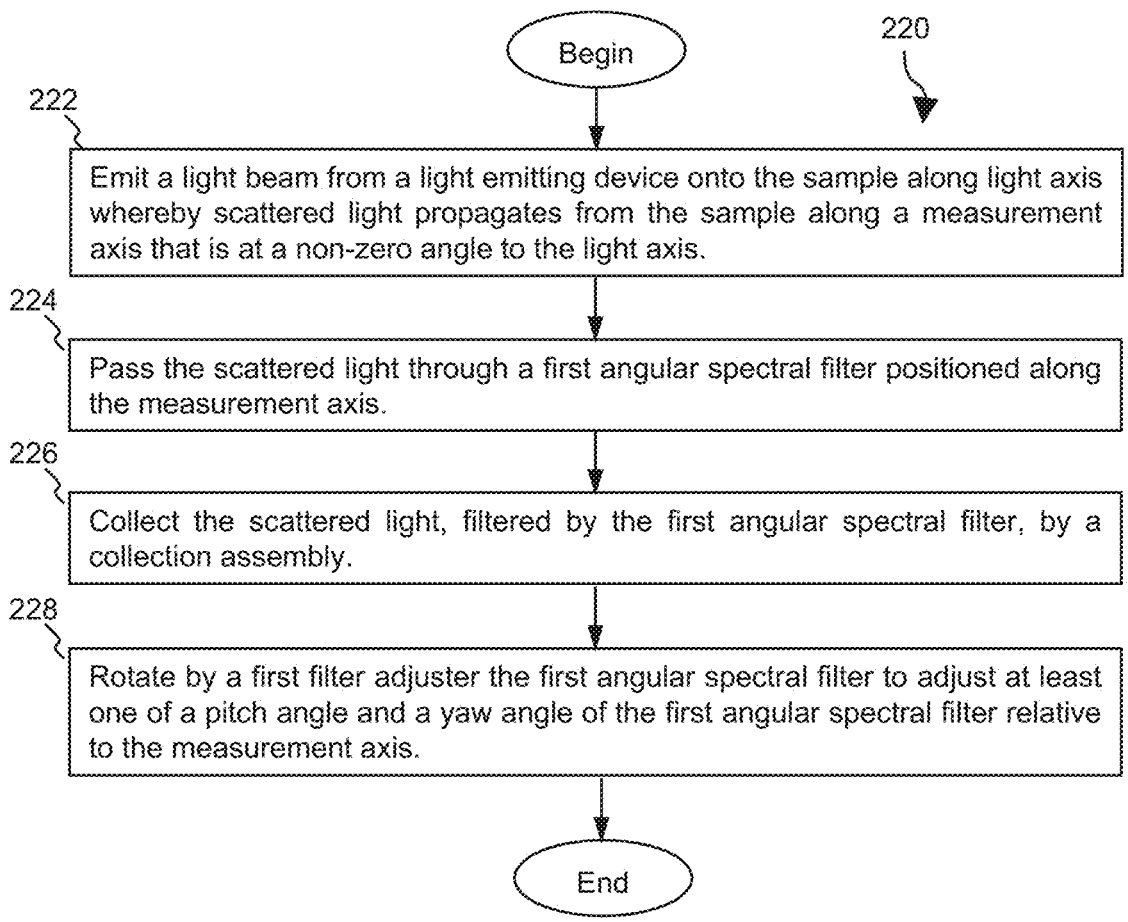
FIG. 15 is a flowchart of an embodiment of a method for the measurement of light scattering from a test article in accordance with principles disclosed herein.

Referring now to FIG. 15, an embodiment of a method 220 for the measurement of light scattering from a test article (e.g., test article 5 shown in FIG. 1). Initially at block 222, method 220 comprises emitting a light beam (e.g., light beam 22 shown in FIG. 1) from a light emitting device (e.g., light emitting device 20 shown in FIG. 1) onto the test article along light axis (e.g., light axis 25 shown in FIG. 1) whereby scattered light (e.g., scattered light 7 shown in FIG. 1) propagates from the test article along a measurement axis (e.g., measurement axis 35 shown in FIG. 1) that is at a non-zero angle to the light axis.

At block 224, method 220 comprises passing the scattered light through a first angular spectral filter (e.g., one of the angular spectral filters 36 and 38 shown in FIG. 1) positioned along the measurement axis. It may be understood that in some embodiments the scattered light may be passed through a single angular spectral filter, or multiple angular spectral filters spaced along the measurement axis. At block 226, method 220 comprises collecting the scattered light, filtered by the first angular spectral filter, by a collection assembly (e.g., collection assembly 30 shown in FIG. 1). At block 228, method 220 comprises rotating by a first filter adjuster (e.g., one of the filter adjusters 37 and 39 shown in FIG. 1) the first angular spectral filter to adjust at least one of a pitch angle and a yaw angle of the first angular spectral filter relative to the measurement axis.

Experiments were conducted pertaining to systems and methods for measurement of light scattering from a test article. Initially, it may be understood that the following experiments described herein are not intended to limit the scope of this disclosure and the embodiments described above and shown in FIGS. 1-15.

In this experimental study, an experimental setup was configured similar to the system 10 shown in FIG. 1. is similar to that shown in FIG. 5. Particularly, a neodymium-doped yttrium aluminum garnet (Nd:YAG) frequency-doubled 532 nm laser (10 Hertz (Hz), 5 nanosecond (ns)) was used as a laser source, and images were captured by an emiCCD camera (PIMAX4:1024EMB, available from Princeton Instruments of Trenton, NJ). Additionally, the imaging was performed with 1:1 imaging optics, and the image size was 13 mm×13 mm for 1024×1024 pixels (the horizontal view was limited by a slit on a spectrometer of the experimental setup). The spectrometer (IsoPlane 320, available from Princeton Instruments) and camera assembly of the experimental setup were rotated to align the spectrometer slit to be parallel with the laser, so the demonstration images were shown rotated by 90°. Further, an OD4 VBG filter designed for 532 nm (BNF-532, available from OptiGrate of Oviedo, FL) was used.

Figure 16:
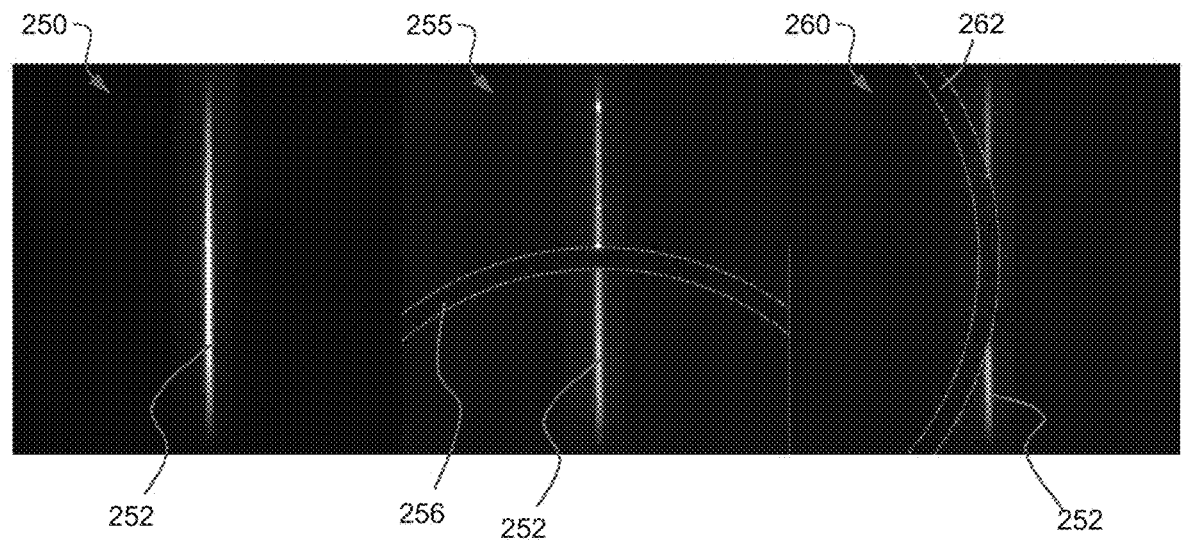
FIG. 16 illustrates an image of a laser line formed without an angular spectral filter in accordance with principles disclosed herein.
Figure 17:
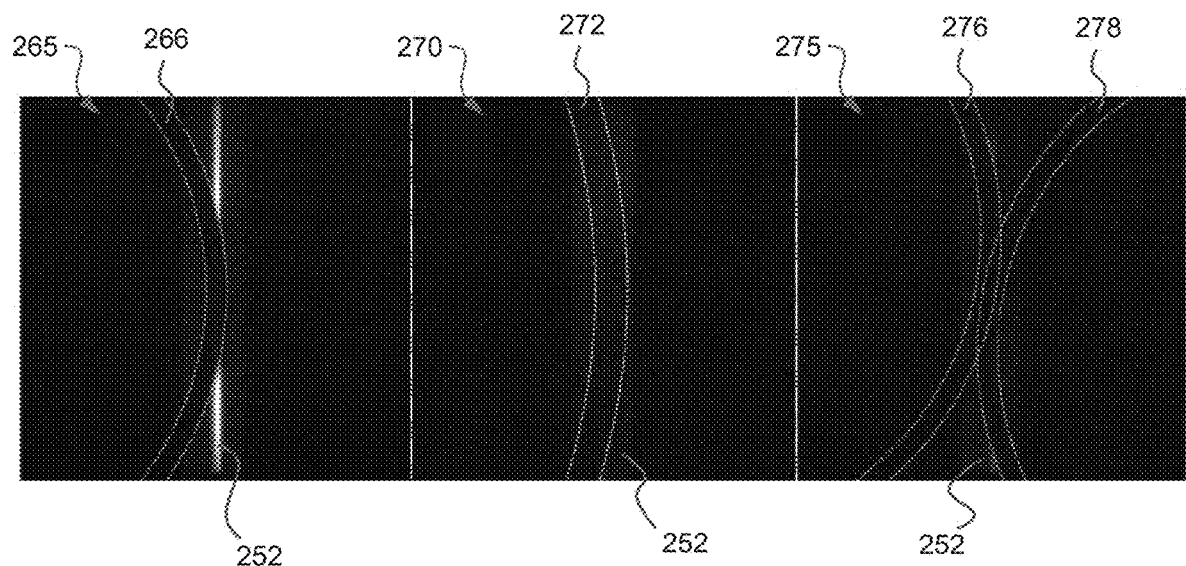
FIG. 17 illustrates images of a laser line formed with an angular spectral filter oriented at specific pitch angles and specific yaw angles in accordance with principles disclosed herein.

Referring to FIGS. 16 and 17, three images 250, 255, and 260 are shown in FIG. 16 each depicting a laser line 252. Particularly: image 250 was formed without a VBG, image 255 was formed with a single VBG (indicated by rejection ring 256 in image 255) oriented at a pitch angle of 0° and a yaw angle of 6°, and image 260 was formed with a single VBG (indicated by rejection ring 262 in image 260) oriented at a pitch angle of 6° and a yaw angle of 0°. Additionally, a collimation lens with a focal length f=100 mm was used to form images 250, 255, and 260.

In FIG. 17, three images 265, 270, and 275 are shown each depicting the laser line 252. Particularly: image 265 was formed with a collimation lens (focal length f=100 mm) and a single VBG (pitch angle of 6° and yaw angle of 0°) indicated by rejection ring 266 in image 265, image 270 was formed with a collimation lens (focal length f=200 mm) and a single VBG (pitch angle of 6° and yaw angle of 0°) indicated by rejection ring 272 in image 270, and image 275 was formed with a pair of VBGs (pitch angle of 6° and yaw angle of 1° for a first of the VGBs and a pitch angle of −6° and yaw angle of −1° for a second of the VGBs indicated by rejection rings 276 and 278, respectively, in image 275.

1D Light Scattering Diagnostics with VBG Filters

Additionally, in this experimental study, 1D spatially-resolved light scattering measurement with VBG filters was demonstrated along with rotational Raman scattering (RRS) and Thomson scattering (TS). A custom vacuum cell and electrode setup was used to control neutral background pressure and discharge voltage conditions. Note that rotational Raman scattering on nitrogen was additionally used for absolute number density calibration of the Thomson scattered light.

As part of this experimental study, a collection system with two VBG filters and test-beds were assembled. For both RRS and TS diagnostics, a 1:1 image relay was used with two f=200 mm lenses, and then, a 1:2 relay into a spectrometer with a combination of a f=50 mm collimation lens and a f=100 mm focusing lens was used. For a non-extended 1D measurement, two VBG filters were aligned so that two rejection rings overlapped each other for doubled attenuation of the laser line. For an extended 1D measurement, two filters were aligned in a way to reject an extended 1D length.

An emiCCD camera (PIMAX4:1024EMB, available from Princeton Instruments of Trenton, NJ) and The spectrometer (IsoPlane 320, available from Princeton Instruments) are used. The system employed Thorlabs achromatic lenses for collection, transmission, collimation and focusing on to the spectrometers. The system used a Ekspla 532 nm Nd:YAG laser operating at 10 Hz with 175 mJ of laser energy per pulse as the interrogation beam. a DC plasma discharge system was driven by a steady 10-kV DC supply (EJ10P60, available from XP Power of Singapore).

Figure 18:
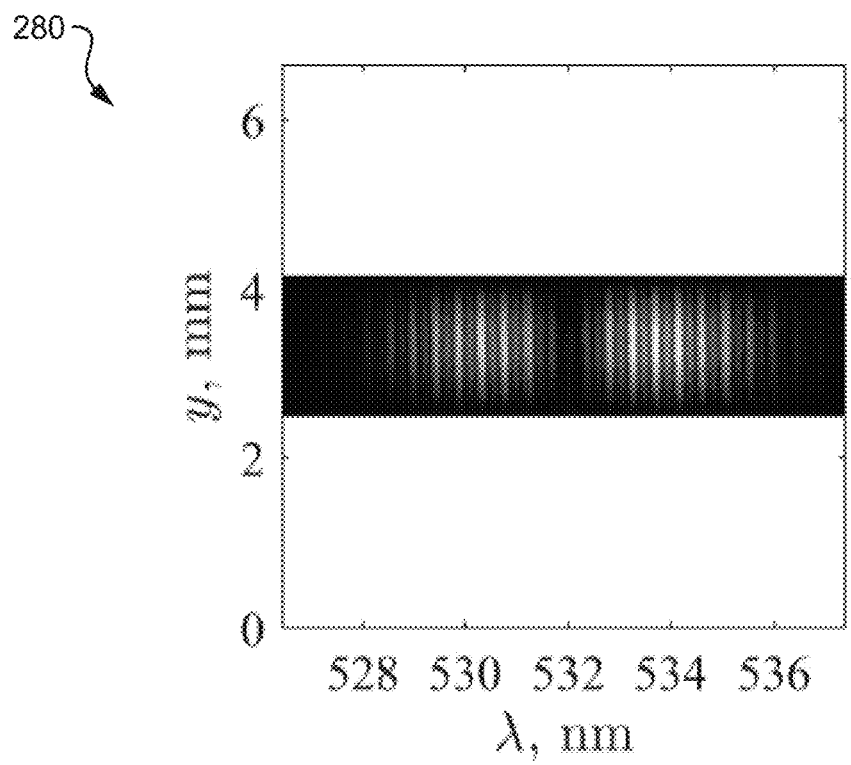
FIGS. 18 and 19 illustrate images of rotational Raman scattering in accordance with principles disclosed herein.
Figure 19:
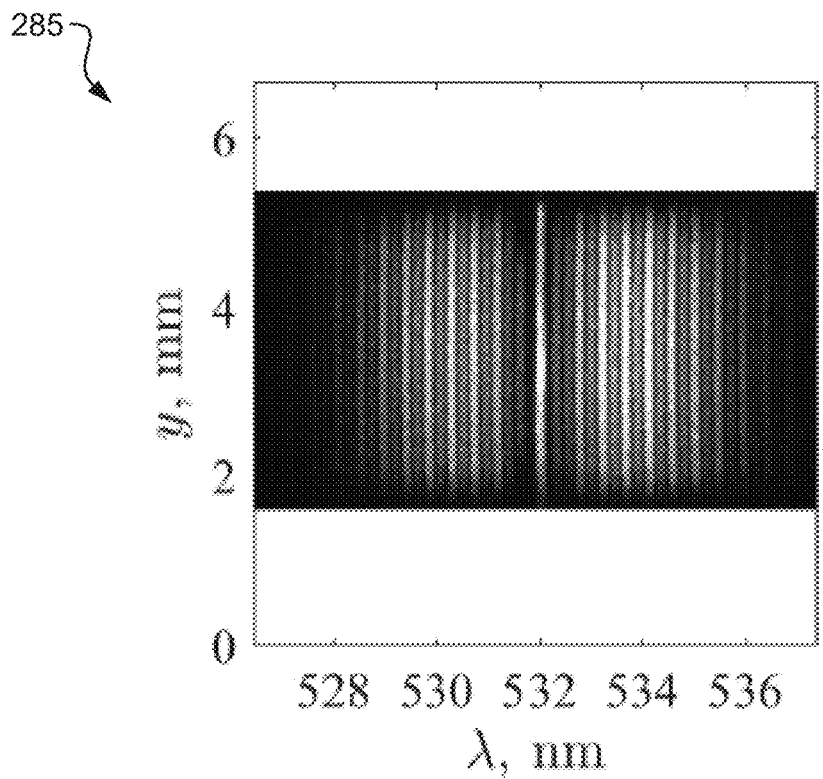
Figure 20:
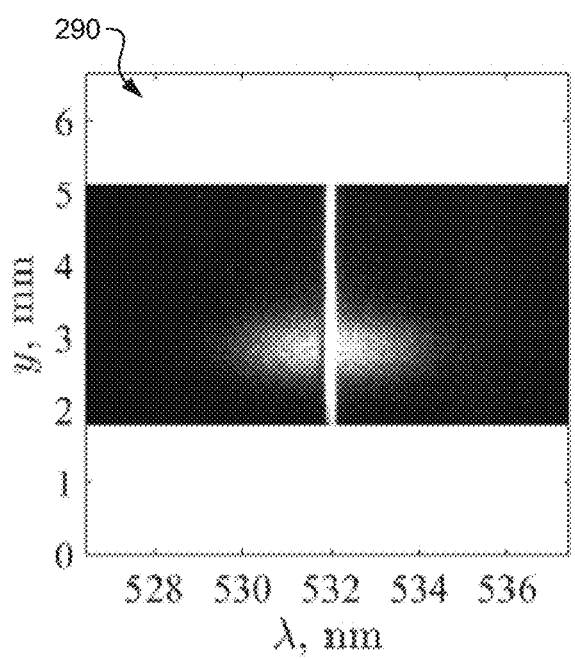
FIG. 20 illustrates an image of Thomson scattering spectra in accordance with principles disclosed herein.
Figure 21:
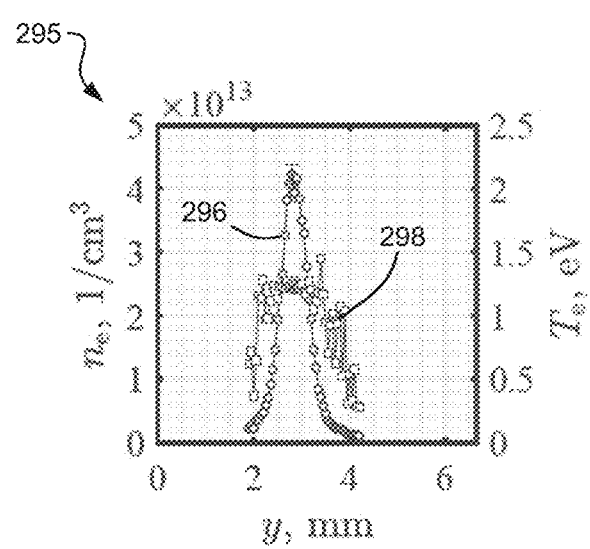
FIG. 21 is a graph depicting spatial distributions of electron density and temperature in accordance with principles disclosed herein.
Figure 22:
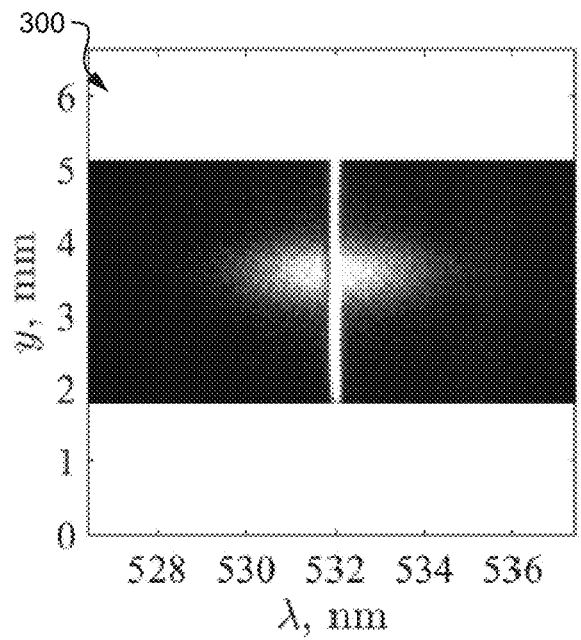
FIG. 22 illustrates an image of Thomson scattering spectra in accordance with principles disclosed herein.
Figure 23:
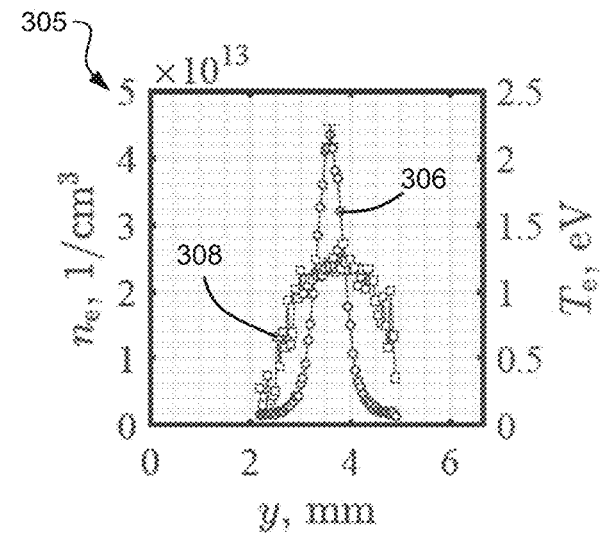
FIG. 23 is a graph depicting spatial distributions of electron density and temperature in accordance with principles disclosed herein.
Figure 24:
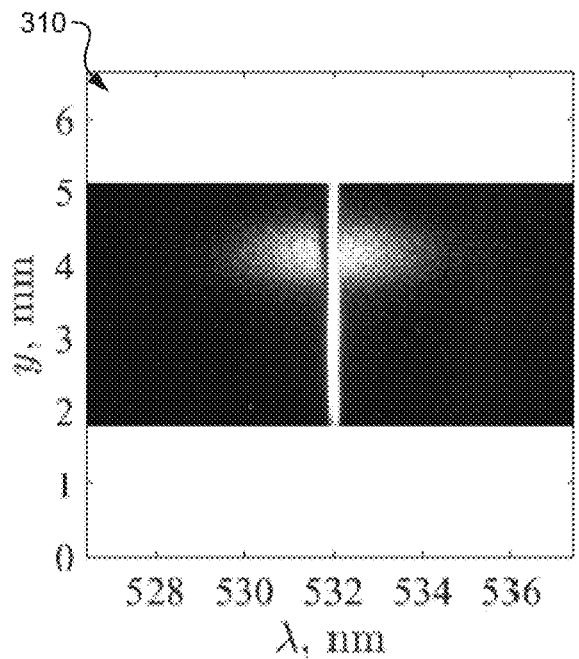
FIG. 24 illustrates an image of Thomson scattering spectra in accordance with principles disclosed herein.
Figure 25:
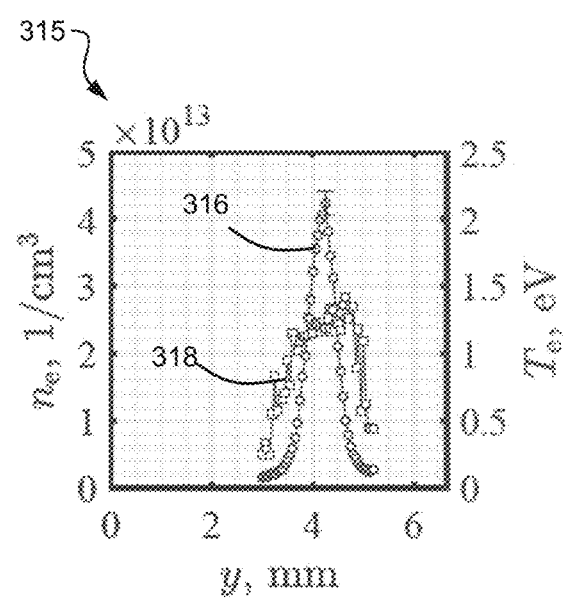
FIG. 25 is a graph depicting spatial distributions of electron density and temperature in accordance with principles disclosed herein.

Referring to FIGS. 18 and 19, images 280 and 285 are shown obtained from the test system. Particularly, images 280 and 285 illustrate RRS of Nitrogen at 150 Torr and at room temperature. Additionally, image 280 was obtained using a single VBG filter while image 285 was obtained using two VBG filters. The laser energy per pulse was 175 mJ and the camera setup was X1000 gain and 200 accumulation when obtaining images 280 and 285. The domain corresponds to the full camera pixels (1024×1024) and the white region shown in images 280 and 285 is where the view was limited by an extra slit to physically block the laser line not covered by the VBG filters. It may be noted that, with an additional VBG filter, the 1D measurable length easily extended approximately two times longer than the case with a single VBG filter.

The system was also used for TS detection. a A DC discharge with argon gas at 150 Torr was used. For TS detection, the camera setup included X1000 gain and 1000 accumulation.

Referring to FIGS. 20-25, FIGS. 20, 22, and 24 illustrate images 290, 300, and 310 of TS spectra obtained from the DC discharge. Images 290, 300, and 310 particularly illustrate three different plasma locations within the resolving 1D region. Additionally, FIGS. 21, 23, and 25 comprise graphs 295, 305, and 315 illustrating spatial distributions of electron density (indicated by numerals 296, 306, and 316 in graphs 295, 305, and 315, respectively) and electron temperature (indicated by numerals 298, 308, and 318 in graphs 295, 305, and 315, respectively). Graph 295 corresponds to image 290 (e.g., they were obtained from the same experiment under the same conditions) while graph 305 corresponds to image 300 and graph 315 corresponds to image 310.

In this example, to demonstrate the extended 1D TS measurement, the plasma column was spatially shifted while keeping the optics/optical axis fixed. Spatial distribution of the calibration coefficient was obtained during the density calibration with the nitrogen RRS (image 285). A local TS spectrum was evaluated to obtain a single point of the distribution curve at every 50 μm. The spatial resolution in the y-direction was 6.5 μm/pixel (1:2 imaging, and the camera resolution of 13 μm/pixel) without any pixel binning. In this example, the TS was successfully captured at the extended 1D length realized by the two VBG filters. The spatial distribution of electron temperature and density confirmed the identical plasma properties detected at different shifted locations. Additionally, thanks to the high resolution of the system, the sharp gradient over a few hundred micrometers of the plasma column was successfully captured.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for measurement of light scattering from a gaseous medium, the system comprising:
    a light emitting device, configured to emit a light beam along a light axis into the gaseous medium from which light is scattered containing spectral information characteristic of the gaseous medium;
    a collection assembly configured to collect scattered light from the gaseous medium along a measurement axis that is oriented at a non-zero angle from the light axis, wherein the collection assembly comprises:
        a first angular spectral filter comprising a first volume Bragg grating (VBG) to produce a first spectral transmission forming a first ring at an image plane captured by the collection assembly; and
        a second angular spectral filter spaced from the first angular spectral filter along the measurement axis and comprising a second VBG to produce a second spectral transmission forming a second ring at the image plane captured by the collection assembly that is offset from the first ring,
    wherein a position or orientation of at least one of the first VBG and the second VBG is adjustable relative to the measurement axis.

2. The system of claim 1, wherein the collection assembly comprises a camera that is configured to capture an image of the scattered light, wherein the first angular spectral filter and the second angular spectral filter are positioned between the gaseous medium and the camera along the measurement axis, and wherein the second angular spectral filter is positioned between the first angular spectral filter and the camera along the measurement axis.

3. The system of claim 2, wherein the collection assembly comprises a monochromator coupled to the camera.

4. The system of claim 1, wherein a pitch or a yaw relative to the measurement axis of at least one of the first VBG and the second VBG is adjustable.

5. The system of claim 1, wherein the first VBG is oriented at a first yaw angle relative to the measurement axis and the second VBG is oriented at a second yaw angle relative to the measurement axis that is different from the first yaw angle.

6. The system of claim 1, wherein the first VBG is oriented at a first pitch angle relative to the measurement axis and the second VBG is oriented at a second pitch angle relative to the measurement axis that is different from the first pitch angle.

7. The system of claim 1, wherein at least one of the first VBG and the second VBG are rotatable about the measurement axis.

8. The system of claim 1, further comprising:
    a collimation lens positioned between the first angular spectral filter and the gaseous medium along the measurement axis.

9. The system of claim 1, wherein the first angular spectral filter and the second angular spectral filter each comprise a notch filter.

10. The system of claim 1, further comprising a filter adjuster coupled to at least one of the first angular spectral filter and the second angular spectral filter for rotating the angular spectral filter relative to the measurement axis.

11. The system of claim 1, wherein a portion of the circumference of the first ring tangentially overlaps the circumference of the second ring each offset circular ring defining an approximate linear region of mutual transmission.

12. A system for measurement of light scattering from a gaseous medium, the system comprising:
- a light emitting device, configured to emit a light beam along a light axis into the gaseous medium from which light is scattered containing spectral information characteristic of the gaseous medium;
- a collection assembly configured to collect scattered light from the gaseous medium along a measurement axis that is oriented at a non-zero angle from the light axis, wherein the collection assembly comprises:
  - a first angular spectral filter positioned along the measurement axis and comprising a first volume Bragg grating (VBG) to produce a first spectral transmission forming a first ring at an image plane captured by the collection assembly; and
  - a first filter adjuster coupled to the first angular spectral filter and configured to rotate the first angular spectral filter to adjust at least one of a pitch angle and a yaw angle of the first VBG relative to the measurement axis.

13. The system of claim 12, further comprising a collimation lens positioned along the measurement axis and having a focal length that is equal to or greater than 25 millimeters (mm).

14. The system of claim 12, further comprising a collimation lens positioned along the measurement axis having a f/# between ½ and 20.

15. The system of claim 12, wherein the first filter adjuster comprises a motorized actuator.

16. The system of claim 12, wherein the collection assembly further comprises:
- a second angular spectral filter spaced along the measurement axis from the first angular spectral filter and comprising a second VBG to produce a second spectral transmission forming a second ring at the image plane captured by the collection assembly that is offset from the first ring; and
- a second filter adjuster coupled to the first angular spectral filter and configured to rotate the second VBG to adjust at least one of a pitch angle and a yaw angle of the second VBG relative to the measurement axis.

17. A method for measurement of light scattering from a gaseous medium, the method comprising:

(a) emitting a light beam along a light axis from a light emitting device into the gaseous medium from which light is scattered gaseous medium containing spectral information characteristic of the gaseous medium along a measurement axis that is at a non-zero angle to the light axis;

(b) passing the scattered light through a first volume Bragg grating (VBG) of a first angular spectral filter positioned along the measurement axis to produce a first spectral transmission forming a first ring at an image plane;

(c) collecting the first spectral transmission, filtered by the first angular spectral filter, by a collection assembly to capture the first ring at the image plane; and (d) rotating by a first filter adjuster the first angular spectral filter to adjust at least one of a pitch angle and a yaw angle of the first VBG relative to the measurement axis.

18. The method of claim 17, wherein (d) comprises orienting the first ring that the first ring extends tangentially along a laser line of the image.

19. The method of claim 17, further comprising:

(e) passing the scattered light through a second VBG of a second angular spectral filter spaced along the measurement axis from the first angular spectral filter to produce a second spectral transmission forming a second ring at the image plane that is offset from the first ring; and (f) rotating by a second filter adjuster the second angular spectral filter to adjust at least one of a pitch angle and a yaw angle of the second VBG relative to the measurement axis.

20. The method of claim 19, wherein (f) comprises rotating the second angular spectral filter relative to the measurement axis independently of the first angular spectral filter.

21. The method of claim 20, wherein a portion of the circumference of the first ring tangentially overlaps the circumference of the second ring each offset circular ring defining an approximate linear region of mutual transmission.

* * * * *